Jan. 7, 1930.  A. J. HAND  1,742,469
CONTINUOUS ELECTRIC ARC WELDING
Filed Feb. 15, 1927  2 Sheets-Sheet 1
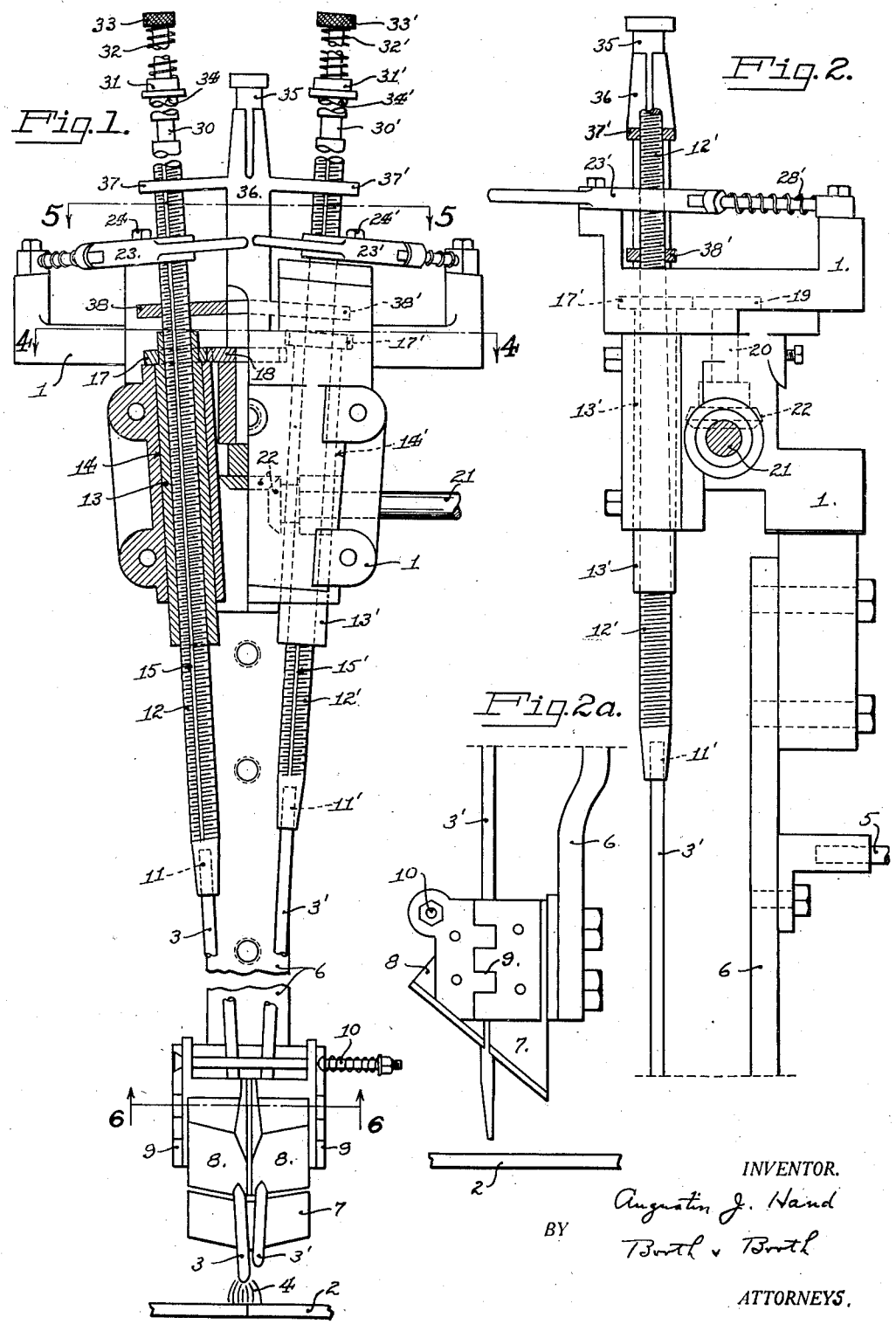
INVENTOR.
Augustin J. Hand
BY Booth & Booth
ATTORNEYS.

Jan. 7, 1930. A. J. HAND 1,742,469
CONTINUOUS ELECTRIC ARC WELDING
Filed Feb. 15, 1927 2 Sheets-Sheet 2
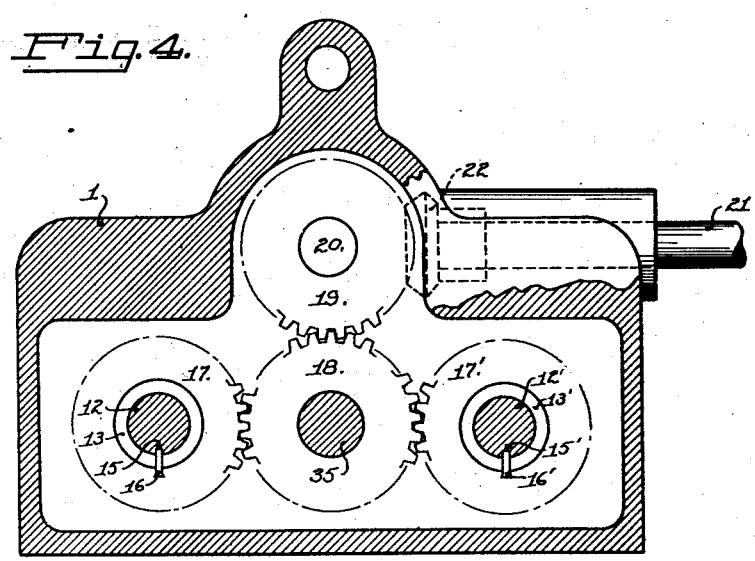
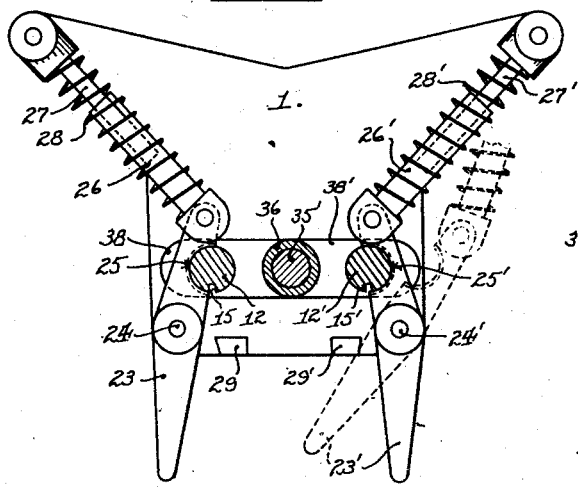
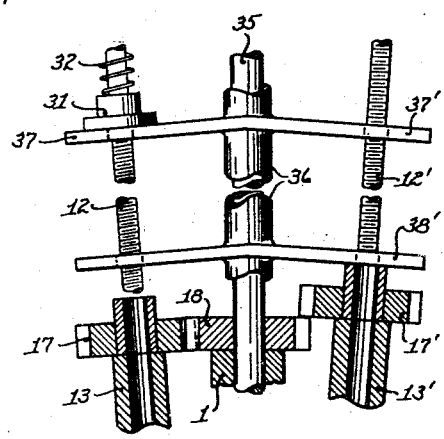
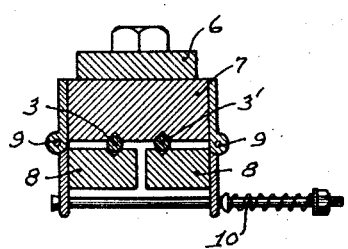
INVENTOR.
Augustin J. Hand
BY Booth & Booth
ATTORNEYS.

Patented Jan. 7, 1930

1,742,469

UNITED STATES PATENT OFFICE

AUGUSTIN J. HAND, OF BERKELEY, CALIFORNIA, ASSIGNOR TO CALIFORNIA CORRUGATED CULVERT COMPANY, OF BERKELEY, CALIFORNIA, A CORPORATION OF CALIFORNIA

CONTINUOUS-ELECTRIC-ARC WELDING

Application filed February 15, 1927. Serial No. 168,303.

My invention relates to electric arc welding, and more particularly to a method and apparatus for holding and feeding electrodes in such a manner as to maintain a continuous arc for an indefinite time.

In electric arc welding, the tip of the electrode is gradually decomposed and burned away by the high temperature of the arc, necessitating a constant forward feeding. When said electrode is finally burned away, it is necessary to stop the process, breaking the continuity of the arc, in order to permit the installation of a new electrode. In welding a continuous seam or joint, such stoppage results in an imperfection in the weld.

The object of my present invention is to provide for maintaining a continuous arc, in order to prevent stoppage for replacing electrodes and to eliminate the imperfections in the work caused thereby.

I achieve this result by providing two alternate electrodes, either one of which is always in operation, so that the other may be removed and replaced when burned away. I also provide means for automatically causing either electrode to take up the load when the other is burned away, and means for automatically feeding forward the active electrode while the other is being replaced.

The objects and advantages of the invention will be apparent from the following specification and the accompanying drawings, which should be read with the understanding that the form, construction, and arrangement of the several parts may be varied, within the limits of the claims hereto appended, without departing from the spirit of the invention as set forth in said claims.

With this in view my invention will now be described fully with reference to the accompanying drawings, wherein:

Fig. 1 is a part sectional front elevation of a welding apparatus embodying my invention.

Fig. 2 is a side elevation of the upper portion of the same.

Fig. 2ᵃ is a side elevation of the lower portion of the same, and is a continuation of Fig. 2.

Fig. 3 is a broken part sectional detail of the feed shifting mechanism, certain parts being omitted for the sake of clearness.

Fig. 4 is a transverse section taken on the line 4—4 of Fig. 1 and enlarged.

Fig. 5 is a transverse section taken on the line 5—5 of Fig. 1.

Fig. 6 is a transverse section taken on the line 6—6 of Fig. 1.

In the drawings, the reference numeral 1 designates the frame of the device, and 2, Fig. 1, is the work. 3 and 3' are the electrodes, both being of the same polarity. It is to be understood that, in the example shown, the work 2 constitutes the electrode of opposite polarity, the arc 4 being formed between said work and one of the electrodes 3 or 3'.

Electric current is supplied to the electrodes 3 and 3' by a wire 5, Fig. 2, connected with a suitable bus-bar 6 secured to the frame 1 and extending downwardly therefrom. At its lower end said bus-bar supports a brush structure contacting with the electrodes. This brush structure preferably comprises a copper block 7, Figs. 1, 2ᵃ, and 6, secured to the bus-bar 6 and suitably grooved to receive the electrodes 3 and 3', and a pair of swinging blocks 8, hinged to the block 7 at 9, grooved correspondingly thereto, and yieldably held by a link and spring device 10 to clamp the electrodes between said blocks 8 and the block 7. Thus the electrodes are free to move up and down, but are held in proper lateral position, and are provided with good electrical connection with the bus-bar 6.

The electrodes 3 and 3' are respectively mounted, at 11 and 11', Fig. 1, in the lower ends of exteriorly threaded holder rods 12 and 12', which are longitudinally slidable in sleeves 13 and 13', and said sleeves are both rotatable and longitudinally movable in suitable bearings 14 and 14' in the frame 1. The rods 12 and 12' are provided with longitudinal grooves or key ways 15 and 15', adapted for engagement with keys 16 and 16' (Fig. 4) secured to the sleeves 13 and 13', so that the respective sleeves and rods must rotate together.

To the upper ends of the sleeves 13 and 13' are secured gears 17 and 17' respectively, Figs. 1, 3 and 4, which mesh with a central idler pinion 18 when said sleeves are in their lowermost positions in their bearings 14 and 14'. The idler 18 meshes with a gear 19 on the upper end of a short vertical shaft 20, Figs. 2 and 4, which is driven by a horizontal shaft 21 through bevel gears 22, Figs. 1, 2 and 4. Thus when said shaft 21 is rotated, by any suitable outside means, not shown, the movement is transmitted through the above described gearing to the sleeves 13 and 13', causing them and the electrode holding rods 12 and 12' to rotate. The sleeve gears 17 and 17' may be thrown out of mesh with the idler 18 by elevating their respective sleeves 13 and 13'. In Figs. 1 and 3, the gear 17 is shown in mesh with the idler 18, whereas the gear 17' is out of mesh therewith.

The rotation of the holder rods 12 and 12' causes them to advance downwardly, to feed the electrodes toward the work, by means of mechanism now to be described. The frame 1, above the gears 17 and 17', supports a pair of swinging arms 23 and 23', Figs. 1 and 5, respectively pivoted at 24 and 24', and provided with semi-circular interiorly threaded sockets 25 and 25', Fig. 5, adapted for engagement with the threads of the rods 12 and 12'. The inner ends of the arms 23 and 23' are connected with the frame by spring snap devices, comprising telescoping members 26 and 27 and 26' and 27' separated by springs 28 and 28', so that said arms are held either in engagement with the rods 12 and 12', as shown in full lines, or out of such engagement, as the arm 23' is shown in dotted lines. Stops 29 and 29' are provided to limit the movement of the arms in their non-engaging positions. Thus when the arms 23 and 23' are in the positions shown in full lines in Fig. 5, the engagement of the threaded sockets 25 and 25' with the rods 12 and 12' causes said rods to advance downwardly when rotated, and when said arms are thrown out of such engagement, as is indicated by the dotted line position of the arm 23', the rods may rotate freely without longitudinal movement.

In the operation of the apparatus, assuming it to be provided with two full length electrodes 3 and 3', one of said electrodes, for example 3, is positioned with its end somewhat below the end of the other electrode 3', as shown in Fig. 1. The sleeve 13 is lowered, to mesh its gear 17 with the idler 18. The other sleeve 13' is raised, to keep its gear 17' out of mesh with said idler. Both feed arms 23 and 23' are thrown into engagement with the rods 12 and 12', the arc 4 is struck, and the feed drive shaft 21 is set in rotation. The arc will play between the work and nearest electrode, as shown.

The rod 12 and the electrode 3 now feed downwardly, the speed of the drive mechanism being understood to be suitably proportioned to the rate of burning away of the electrode. The electrode 3' remains at rest. This condition continues until the electrode 3 is so far burned away as to be no longer serviceable, whereupon its advance is automatically stopped, and the other electrode 3' begins to advance. When the end of the second electrode 3' approaches closer to the work than the now stationary first electrode 3, the arc naturally jumps over to said second electrode and so remains. The first electrode 3 can then be removed and replaced, in readiness to take up the arc when the second electrode 3' is burned away. Thus the arc is continuously maintained.

The mechanism for automatically shifting the feed from one electrode to the other will now be described. At the upper ends of the rods 12 and 12', immediately above their threaded portions, are smooth portions of reduced diameter shown at 30 and 30', Fig. 1, and a short distance above these are slidable collars 31 and 31'. Springs 32 and 32' interposed between said collars and suitable heads 33 and 33', press said collars downwardly against suitable limiting shoulders 34 and 34'. Between the rods 12 and 12', a fixed stud 35 rises from the frame 1, and carries a slide 36, which has an upper pair of lateral arms 37 and 37' and a lower pair of arms 38 and 38', Figs. 1 and 3. These arms are provided with apertures through which the rods 12 and 12' freely pass.

Assuming the apparatus to be operating as described above, with the electrode 3 carrying the arc and being fed downwardly when said electrode is burned away to its limit, the smooth reduced portion 30 of the rod 12 comes under the threaded feed arm 23, and the downward feed of said electrode thereupon ceases. Slightly before said downward feed ceases, however, the collar 31 contacts with the upper arm 37 of the slide 36, and said slide is thereby carried downwardly with the last portion of the feeding movement of the rod 12. This causes the lower arm 38' of said slide to bear upon the upper end of the sleeve 13', as shown in Fig. 3, and to move said sleeve downwardly, causing its gear 17' to engage the continuously rotating idler 18.

Both rods 12 and 12' are now rotating. The rod 12' with its electrode 3' begins to feed downwardly, while the downward feed of the rod 12 ceases as described above. The electrode 3' thereupon takes up the arc, and continues the process without interruption. The operator then removes the rod 12 and what remains of the electrode 3, first swinging the threaded feed arm 23 to its non-engaging position. He also raises the sleeve 13 to disengage its gear 17 from the idler 18, at the same time raising the slide 36 to its upper or normal position. After installing a new electrode in the end of the rod 12, he re-inserts said rod into its sleeve 13 and lowers it until the end of its electrode passes through the contact brush structure 7—8, and is slightly above the active end of the electrode 3'. He then snaps the feed arm 23 into engagement with the rod 12, and the parts are in positions corresponding to but reversed from those initially described. The operation may thus be continued indefinitely without breaking the arc.

I claim:—

1. A continuous electric arc welding apparatus comprising a plurality of adjacent electrodes maintained at the same electrical potential; another electrode positioned to establish an arc between it and any of the first mentioned electrodes.; and means for automatically transferring the arc without interruption from one to another of the first mentioned electrodes.

2. A continuous electric arc welding apparatus comprising a plurality of adjacent electrodes maintained at the same electrical potential; another electrode positioned to establish an arc between it and any of the first mentioned electrodes; and means for successively feeding the first mentioned electrodes forwardly to automatically transfer the arc without interruption from one to another thereof.

3. A continuous electric arc welding apparatus comprising a plurality of adjacent electrodes maintained at the same electrical potential; another electrode positioned to establish an arc between it and any of the first mentioned electrodes; means for feeding the first mentioned electrodes forwardly; and means for automatically transferring the feeding movement and the arc from one to another of the first mentioned electrodes without interruption.

4. A continuous electric arc welding apparatus comprising a plurality of adjacent electrodes maintained at the same electrical potential; another electrode positioned to establish an arc between it and any of the first mentioned electrodes; means for transferring the arc from one to another of the first mentioned electrodes without interruption; and means for automatically feeding the active one of the first mentioned electrodes forwardly.

5. A continuous electric arc welding apparatus comprising a pair of adjacent electrodes maintained at the same electrical potential; and means for alternately and independently feeding said electrodes forwardly.

6. A continuous electric arc welding apparatus comprising a pair of adjacent electrodes maintained at the same electrical potential; mechanism for separately feeding said electrodes forwardly; power driving means; and means for alternately connecting said power driving means with the feed mechanism of the two electrodes.

7. A continuous electric arc welding apparatus comprising a pair of adjacent electrodes maintained at the same electrical potential; a pair of rotatable and longitudinally movable threaded rods by which said electrodes are respectively carried; members adapted for threaded engagement with said rods to cause them to advance when rotated; means for rotating said rods; and means for transferring said rotating means from one to the other of said rods.

8. A continuous electric arc welding apparatus comprising a pair of adjacent electrodes maintained at the same electrical potential; a pair of rotatable and longitudinally movable threaded rods by which said electrodes are respectively carried; members adapted for threaded engagement with said rods to cause them to advance when rotated; means for rotating each rod independently; a continuously rotating member; and means for successively throwing said rod rotating means into engagement with said rotating member.

9. A continuous electric arc welding apparatus comprising a pair of adjacent electrodes maintained at the same electrical potential, a pair of rotatable and longitudinally movable threaded rods by which said electrodes are respectively carried; members adapted for threaded engagement with said rods to cause them to advance when rotated, said members being movable into and out of such engagement; and means for successively rotating said rods.

10. A continuous electric arc welding apparatus comprising a pair of adjacent electrodes maintained at the same electrical potential; a pair of rotatable and longitudinally movable threaded rods by which said electrodes are respectively carried; members adapted for threaded engagement with said rods to cause them to advance when rotated; a driving gear; and a gear surrounding and rotating with each rod, and adapted for axial movement into and out of engagement with said driving gear.

11. A continuous electric arc welding apparatus comprising a pair of adjacent electrodes maintained at the same electrical potential; a pair of rotatable and longitudinally movable threaded rods by which said electrodes are respectively carried; members adapted for threaded engagement with said rods to cause them to advance when rotated; a driving gear; a gear surrounding and rotating with each rod, and adapted for axial movement into and out of engagement with said driving gear; and means for automatically moving said rod gears into such engagement with said driving gear.

12. The method of maintaining a continuous arc in electric welding which consists in independently advancing a plurality of separate electrodes maintained at the same electrical potential and automatically transferring an arc without interruption from one electrode to another.

13. A continuous electric arc welding apparatus comprising a pair of electrodes positioned with their active ends adjacent each other; a guide member with which said electrodes have sliding contact, said guide member being adapted to conduct an electric current to both said electrodes at the same potential; and means for alternately advancing said electrodes.

14. The method of maintaining a continuous electric arc which consists in successively advancing a plurality of electrodes maintained at the same electrical potential toward another electrode maintained at a different electrical potential; causing an arc to play between said other electrode and the advancing first mentioned electrode; and transferring the arc, without interrupting its continuity, from one to another of the first mentioned electrodes as the same are successively advanced.

15. The method of electric welding which consists in fusing the work by maintaining an arc continuously and without interruption between it and one of a plurality of electrodes maintained at the same electrical potential, by the automatic timely substitution of said electrodes.

In testimony whereof I have signed my name to this specification.

AUGUSTIN J. HAND.